United States Patent Office 3,393,459
Patented July 23, 1968

3,393,459
PROBE AND PROBE HOLDING DEVICE FOR A COORDINATE MEASURING MACHINE
John H. Lanahan, Whitesboro, and Robert I. Leach, Clinton, N.Y., assignors to The Bendix Corporation, Utica, N.Y., a corporation of Delaware
Filed July 1, 1965, Ser. No. 468,903
1 Claim. (Cl. 33—174)

ABSTRACT OF THE DISCLOSURE

A probe and probe holding device which employs two sets of bearings to allow the probe to telescope into and out of the probe holder. Each set of bearings employs three bearings which are equidistantly spaced about the probe. One bearing of each set is spring-biased toward the center of the probe such that an increase in spring tension immobilizes the probe. The fixed bearings are so arranged that probe posiiton relative to a coordinate measuring machine is a fixed known value.

The present invention relates to coordinate measuring machines for measurement and layout of castings, machined parts, sheet metal parts, tools, dies, printed circuits and other similar applications. More particularly, this invention relates to a novel probe and probe holding apparatus for such a measuring machine; the probe apparatus contacts the physical property to be measured and must be freely movable in the probe holder while maintaining great accuracy.

The present invention may be used, for example, with a coordinate measuring machine of the type disclosed in co-pending, commonly-assigned patent application Ser. No. 468,736, filed concurrently with the present application in the names of Robert Leach and John Lanahan and entitled "Coordinate Measuring Machine."

In coordinate measuring machines, it is necessary to accurately locate the probe axis relative to the probe holder. In prior art devices, this relationship was established by a bearing arrangement or a locating device mounted in the probe holder which locked into engagement with the probe surfaces. Such an arrangement produced several undesirable results. High forces were maintained on the bearing or locating structure as well as on the probe. Such forces reduced bearing and probe life. Further, coordinate measuring machines are frequently employed in work areas which are surrounded by small bits of foreign matter such as metal chips, sand and other small hard objects. Such objects were frequently carried into the bearing or locating structure of prior art devices, damaging the bearing or locating structure and the probe and jamming the machine. To telescope the probe within the probe holder in prior art devices required either a gear arrangement or a release of the bearing or locating devices. The present invention provides for easy one-handed telescoping of the probe.

Prior art devices required high tolerances because of the number and arrangement of parts necessary to properly locate the probe. The present invention provides a low-cost accurate probe and probe holder. One embodiment of the present invention has a probe with a flat side to insure that the probe will always be in the same orientation within the probe holder, thus eliminating the problem which might arise from the inevitable concentric error inherent in the probe. The bearing structure of the present invention is so designed to eliminate any unbalanced forces on the probe tending to bend the probe and yet to maintain a constant bearing force on the probe.

Objects of this invention, therefore, are to provide a low cost, sturdy, durable probe and probe holder arrangement for accurately locating the probe, to provide a device wherein probes may be changed without the use of hand tools or unlocking devices, to provide probes which are shaped to aid proper positioning, to provide a probe structure which speeds and eases interchange of probes, to provide an adjustable locating device which causes a minimum of wear on bearing and probe surfaces. It is contemplated that this novel probe and probe holder may be employed in hand-powered coordinate measuring machines in use in factory areas; therefore, additional objects of this invention are to provide a rugged structure capable of withstanding the inevitable rough handling the machine will receive and to provide a structure able to survive the concomitant dirt, dust and other foreign matter.

Other objects and advantages will be apparent from the following illustration and description of operation of an embodiment of the novel probe and probe holding apparatus.

FIGURE 1 can be considered to be a view taken along the line 1—1 of FIGURE 2;

FIGURE 3 can be considered to be a view taken along the line 3—3 of FIGURE 4.

Figure 1:
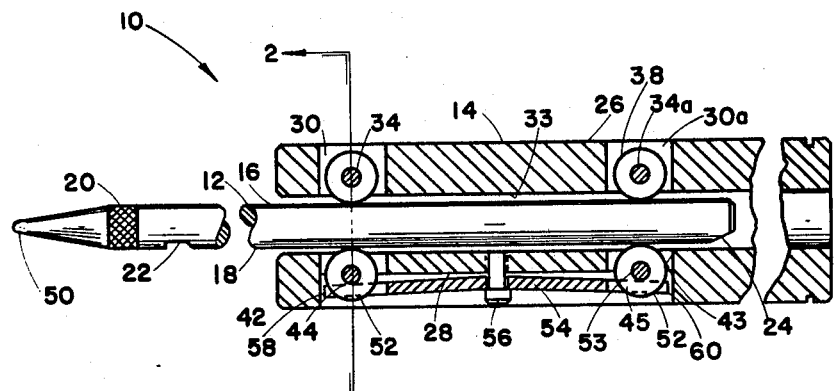
FIGURE 1 is a transverse view of an embodiment of the present invention, partly broken away and partly in section, showing a probe, probe holder, mounting pins and bearing structure.

Referring now to FIGURE 1, a probe and probe holding apparatus for use in a coordinate measuring machine, shown generally by the numeral 10, has a probe 12 and probe holder 14. The probe has a generally-cylindrical outer surface 16 and an axially-extending flat surface 18. Near one transverse end of the probe is a knurled surface 20 and a radially-inwardly-depending surface or detent recess 22.

The probe holder 14 has a cylindrical outer surface 26 and an axially-extending recess or flat side 28 formed along the greater axial extent of one side of the holder 14.

A first set of radially-extending bearing slots 30 and 32 are formed in a common transverse plane in holder 14 extending from cylindrical outer surface 26 through to an inner cylindrical surface 33. The bearing slots 30 and 32 are spaced circumferentially, approximately 120° from each other and flat side 28 of the holder. A second set of bearing slots similar to that described are spaced axially from the first set and bear the same numerals and the added subscript "a." Bearings 34 and 36 are disposed in slots 30 and 32 respectively. Chordal mounting channels 38 and 40 intersect the bearing slots 30 and 32 respectively. The axially-extending recess 28 has axially-spaced bearing slots 42 and 43 into which are fitted bearings 44 and 45 respectively. The bearing slot 42 is in a common transverse plane with slots 30 and 32 and slot 43 is similarly arranged with respect to the second set of bearing slots. Mounting pins or shafts 46 and 48 are journalled into the mounting pin channels 38 and 40 respectively to provide fixed axis mountings for their respective bearings.

Bearings 44 and 45 are journalled on mounting pins or shafts 52 and 53 respectively. An axially-extending flat spring 54 has a holding screw 56 fitted therethrough intermediate of its transverse ends 58 and 60. Each transverse end is bifurcated to enable the spring to hold at each end one of the bearing mounting pins 52 and 53.

In the embodiment shown, the bearings 34, 36 and 44 are approximately 120° apart to distribute bearing forces equally over the probe surface. Bearings 34 and 36 are fixed to provide a known reference position for probe 16, thereby permitting accurate location from a fixed reference for the coordinate measuring machine. Bearings 34 and 36 are mounted on their respective mounting shafts 46 and 48 to permit axial motion of the probe but not radial motion of the probe. The bearings 44 and 45 are pressed against the flat surface 18 of the probe by the actions of the spring 54 on the mounting pins 52 and 53 which, in turn, press the probe against the fixed bearings. Bearings 44 and 45, once in compressive engagement with the flat surface 18, will freely permit only axial motion of the probe. The flat side 18 prevents rotation of the probe within the probe holder due to its bias against the axially-flat, circumferentially-round outer race of bearings 44 and 45. The detent recess 22 will be engaged by bearing 44 to hold the probe 16 in a fully telescoped or inoperative position when it is not in use.

The oblique surface 24 permits easy entry and withdrawal of the probe from the probe holder past the spring loaded bearings 44 and 45. In measuring devices of this type, it is extremely important to be able to change probe speedily without damaging either the probe or bearing surfaces.

The knurled surface 20 is formed on the probe to aid hand operation of the coordinate measuring machine. The knurled surface is axially spaced away from the detent recess 22 so that the foreign matter such as small metal chips, acids, hand oils and other like substances inadvertently placed on the probe will not come accidentally into contact with the bearings.

Figure 2:
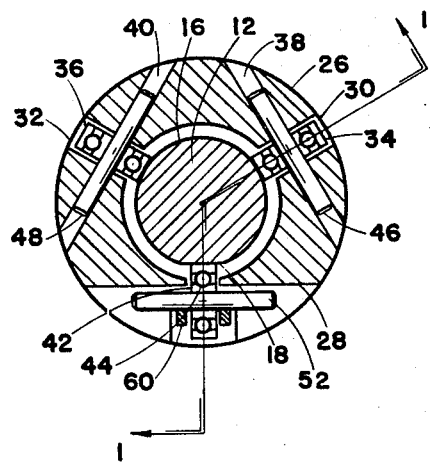
FIGURE 2 is an axial view in section of the embodiment shown in FIGURE 1 and is taken along the plane 2—2 shown in FIGURE 1.
Figure 3:
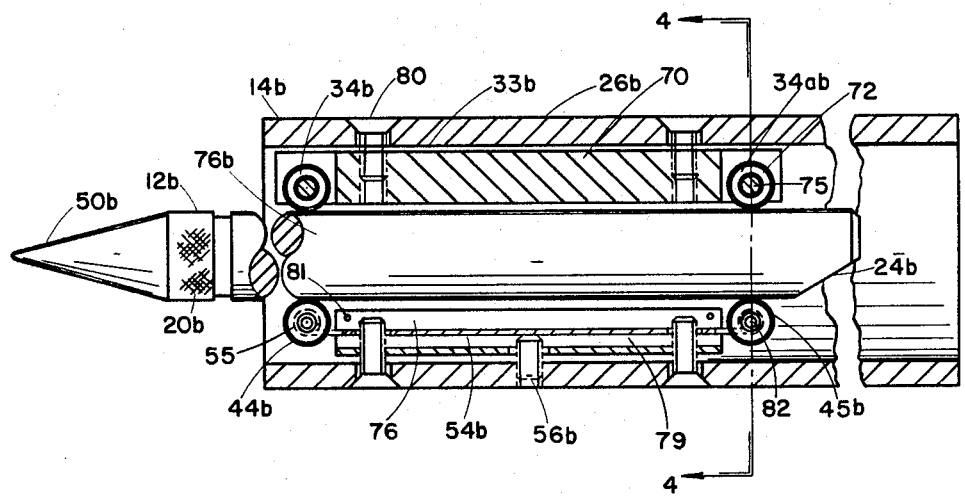
FIGURE 3 is a transverse view of another embodiment of the present invention, partly broken away and partly in section, showing a probe, probe holder, mounting devices and bearing structure.
Figure 4:
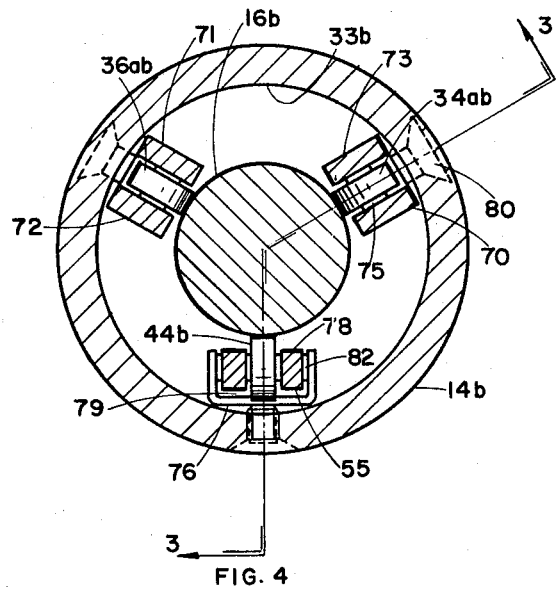
FIGURE 4 is an axial view in section of the embodiment shown in FIGURE 3 taken along the plane 4—4 shown in FIGURE 3.

In FIGURES 3 and 4 are shown views of a second embodiment of the present invention wherein similar parts perform similar functions. To avoid needless repetition of description, structure in FIGURES 3 and 4 similar to structure in FIGURES 1 and 2 will have the same numbers as in FIGURES 1 and 2 followed by the suffix "b." The embodiment shown in FIGURES 3 and 4 employs a probe holder member 14b having a generally-cylindrical inner surface 33b and a generally-cylindrical outer surface 26b. The generally-cylindrical inner surface 33b is substantially concentric to the probe 12b. Bearing holder members 70 and 72 have bifurcated transverse ends 71 and 73 respectively adapted to encompass the radially-fixed bearings which are connected to the bearing holder members by pins 75 or other suitable devices. The bearing holders 70 and 72 are connected to the probe holder member 14b by screws 80. The bearing holder 76, for the radially-movable bearings 52b, 53b, has a channel 79. The movable bearings are held on axially-extending spring 54b, typically metal, having radially-extending or coiled transverse ends 55, which are bifurcated 78, by shafts or pins 82. Pins 81 are fitted through the transverse ends of bearing holder 76 to restrain or hold the movable bearings when the probe 16b is removed from the probe holder 14b.

The embodiment of the present invention, shown in FIGURES 3 and 4, eliminates the cost of forming chordal channels and radial slots. It can be readily appreciated that the flat sided probe shown in FIGURES 1 and 2 could be used on the probe holder shown in FIGURES 3 and 4.

It can be readily appreciated that the present invention achieves the stated objects. The bearings fix the probe position firmly in the probe holder with a relatively-light pressure normal to the bearing surfaces. The light holding pressure prolongs bearing and probe life and, in addition, permits easy telescoping of the probe within the probe holder. The light holding pressure will yield to pass dirt, metal chips and other like foreign matter without either jamming the probe in the probe holder or damaging the bearings or probe surface. Further, in those devices in which the probe is fixed by relatively-heavy bearing forces, an impact or blow to the probe is likely to damage either the bearing surface or the probe surface or both. The present invention, by having one relatively-movable bearing slot, materially reduces the risk of that type of damage. The present invention, by locating the bearing set in common transverse planes, eliminates error inducing bending movements on the probe. The present invention, while holding the probe rigidly relative to the probe holder in a known position, permits easy interchange of probes without requiring any hand tools or locking and unlocking devices. The use of a flat sided probe, as shown in one embodiment of the present invention, and the movable bearings and spring arrangement permit lower part tolerances, thereby allowing for a less expensive construction without sacrificing coordinate measuring machine accuracy.

The present embodiments show a probe having a conical tip 50. Various other tip shapes may be used in the probe, depending on the quantity or quality to be measured. Probe tips could, for example, be cylindrical or could be threaded. Other probe tips could carry mechanisms for measuring internal diameters or electrical resistance. A measuring machine may be required to perform a multitude of different measuring tasks on the same or different workpieces. To do such jobs accurately and speedily requires ready interchangeability of probe tips with a minimum of waste motion. The present invention accomplishes that function by the novel probe and probe holder apparatus described herein. What is taught herein is a rugged, low-cost, accurate and easy to operate novel probe and probe holder.

Variations may be made in the specific structure and arrangement of the elements herein described without departing from the scope or the spirit of the parent invention.

We claim:
1. In a position measuring device comprising:
an axially-extending movable probe means having a generally-cylindrical outer surface;
a probe holder member having a generally-cylindrical, axially-extending inner passage therethrough substantially concentric to and adapted to encompass said probe means;
a plurality of axially-spaced fixed first bearing means;
a plurality of axially-spaced fixed second bearing means;
a plurality of axially-spaced, radially-movable bearing means;
first and second bearing holder means having bifurcated transverse ends for connecting said first and second bearing means to said probe holder member on substantially common axial lines;
third bearing holder means having an axially-extending channel;
axially-extending spring means adapted to fit into said third bearing holder means channel and having radially-extending bifurcated transverse ends, said spring means compressing said movable bearing means against said probe means and said probe means against said fixed bearing means for holding said probe means in a known radial position relative to the measuring machine; and means for mounting the probe holder on the measuring device.

References Cited

UNITED STATES PATENTS

| | | | |
|---|---|---|---|
| 1,256,748 | 2/1918 | Von Post | 308—6 |
| 2,258,177 | 10/1941 | Edwards | 308—6 |
| 2,341,947 | 2/1944 | Roberts. | |
| 3,168,304 | 2/1965 | Condon | 308—3.8 X |
| 3,286,353 | 11/1966 | Potter | 33—174 |
| 3,316,644 | 5/1967 | Baker et al. | 33—79 |

FOREIGN PATENTS 1,006,133  1/1952  France.

SAMUEL S. MATTHEWS, *Primary Examiner*.